J. F. OSBORN.
COMBINATION PHONOGRAPH AND MOVING PICTURE MACHINE.
APPLICATION FILED MAY 28, 1918.
1,328,189.
Patented Jan. 13, 1920.
4 SHEETS—SHEET 1.
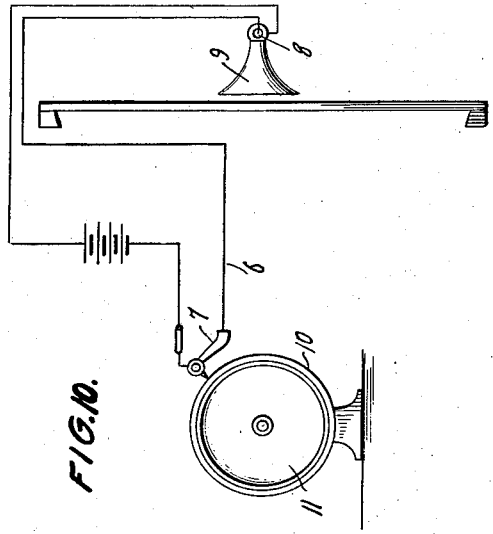
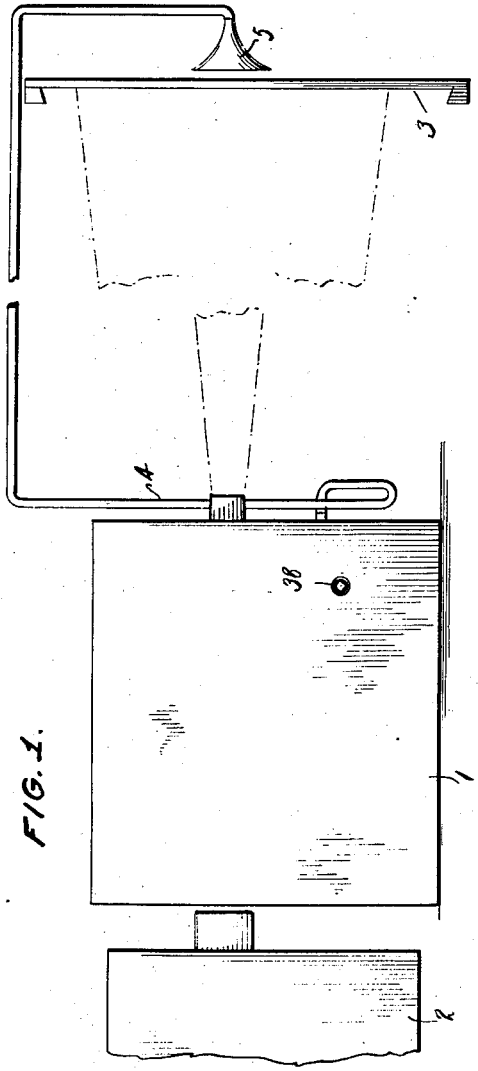
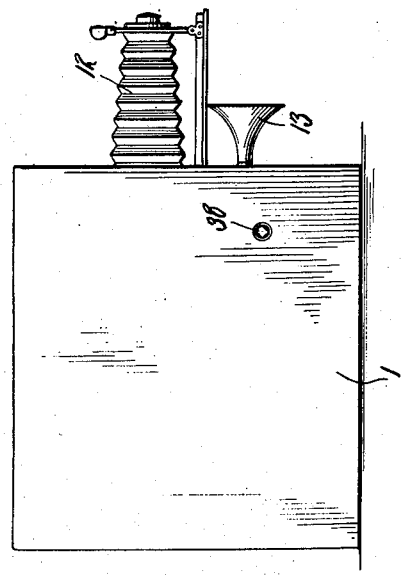
WITNESSES
INVENTOR
John F. Osborn
BY
ATTORNEY

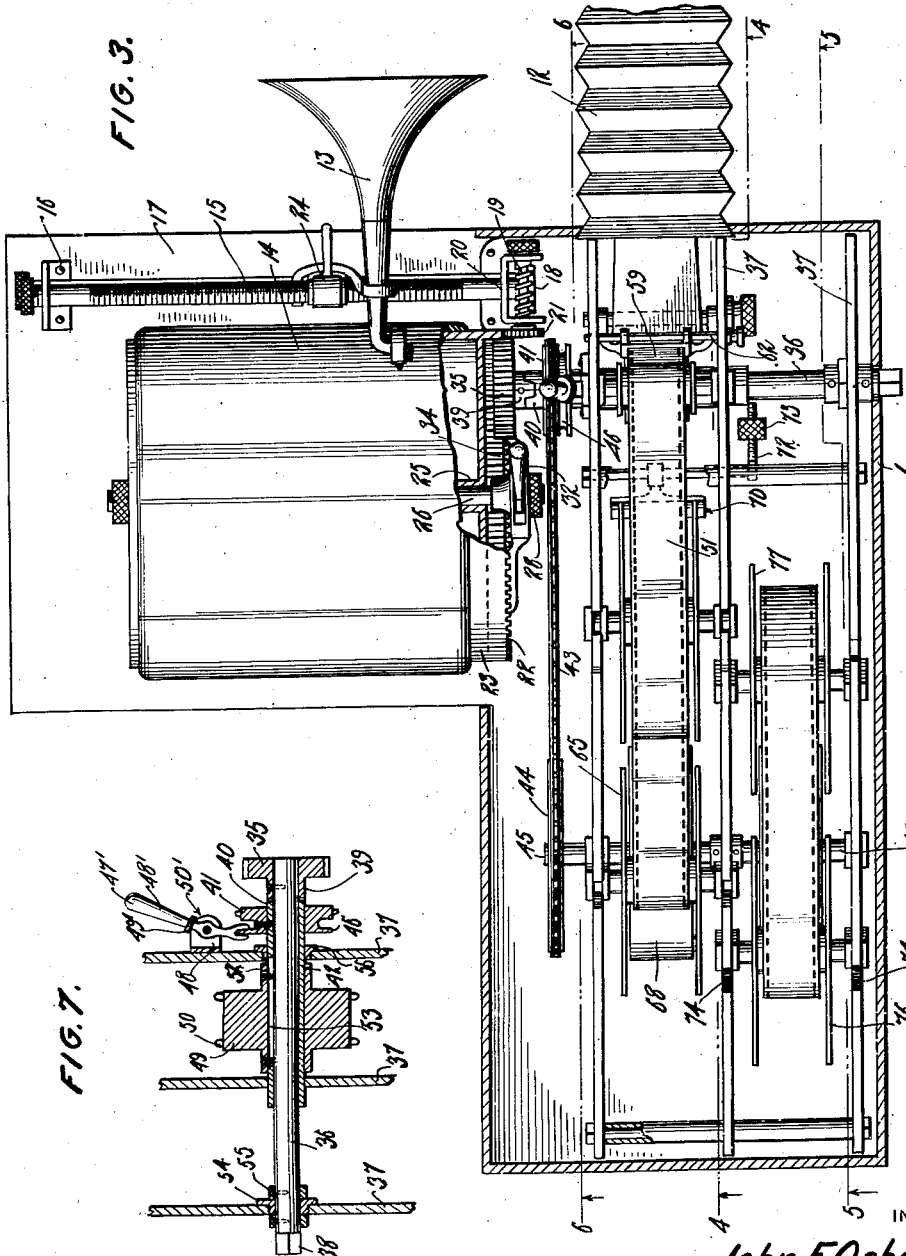

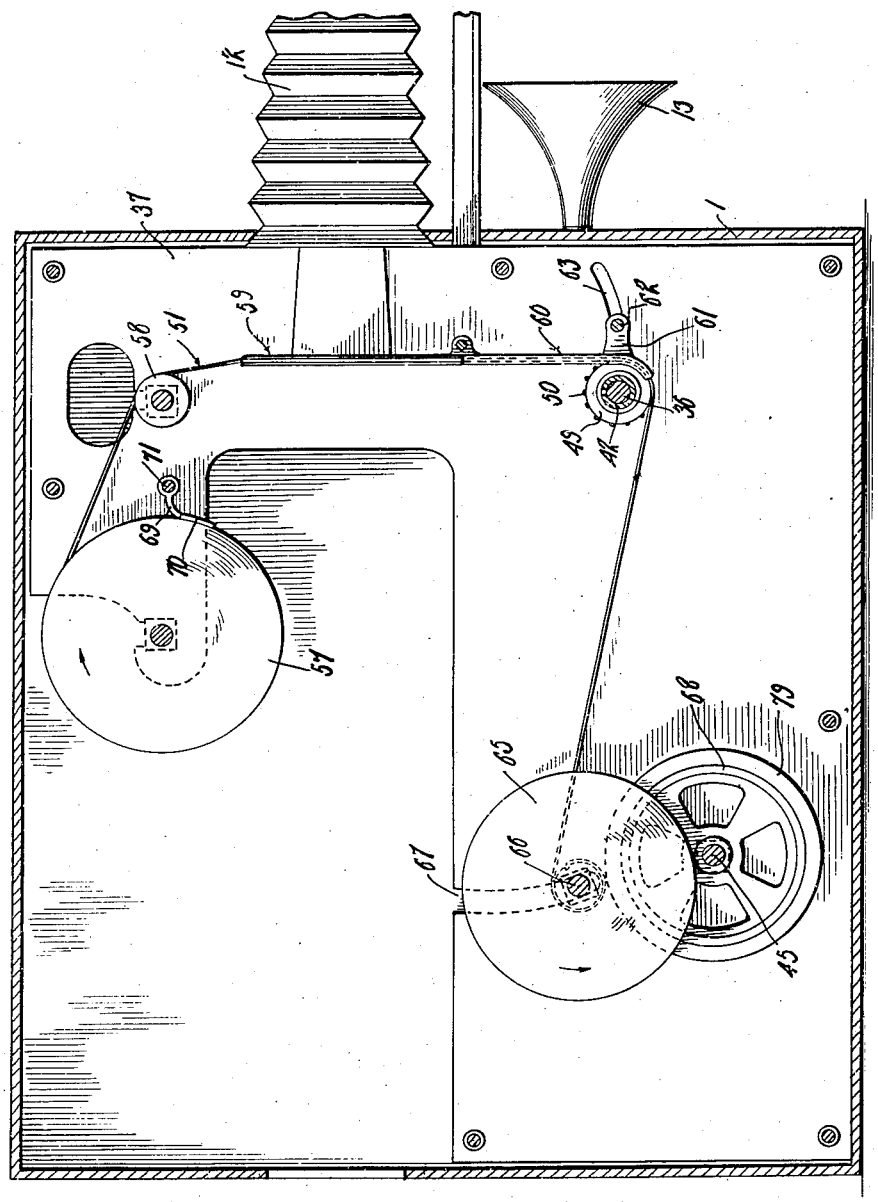

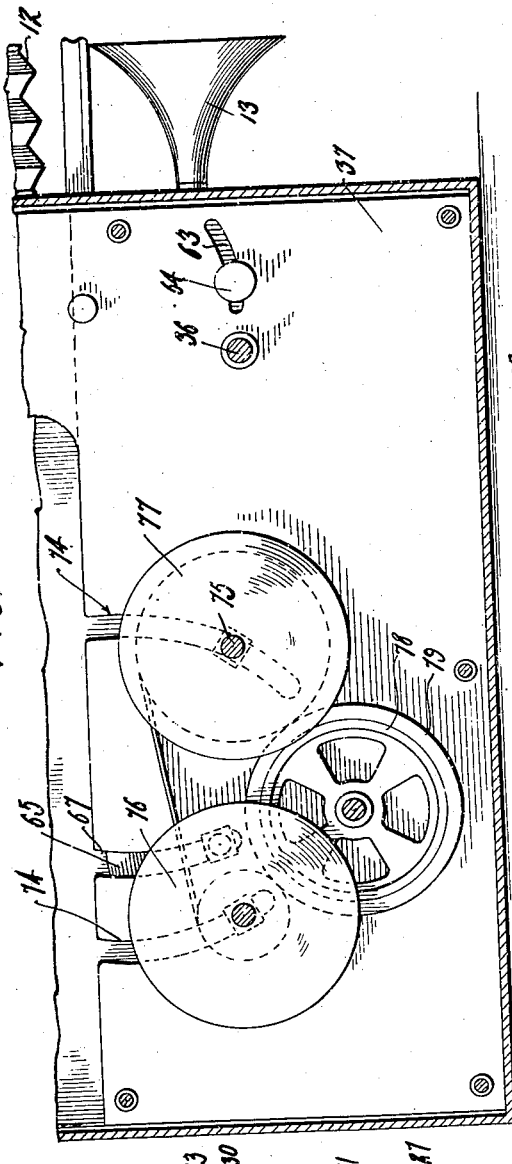

UNITED STATES PATENT OFFICE.

JOHN F. OSBORN, OF LUDINGTON, MICHIGAN.

COMBINATION PHONOGRAPH AND MOVING-PICTURE MACHINE.

1,328,189.    Specification of Letters Patent.    Patented Jan. 13, 1920.

Application filed May 28, 1918. Serial No. 237,042.

*To all whom it may concern:*

Be it known that I, JOHN F. OSBORN, a citizen of the United States, residing at Ludington, in the county of Mason and State of Michigan, have invented certain new and useful Improvements in Combination Phonograph and Moving-Picture Machines, of which the following is a specification.

This invention relates to a combination motion picture and phonograph machine and has for its object the production of an efficient and simple means for positively feeding the record and film in perfect unison.

Another object of this invention is the production of a simple and efficient means for evenly feeding the film and preventing the same from unwinding from the supporting roller at too rapid a rate.

A still further object of this invention is the production of a simple and efficient means whereby the record may be thrown out of operation when it is so desired for permitting the film to actuate independently of the record.

A still further object of this invention is the production of a simple and efficient means for permitting the film to be rewound from the same driving mechanism which actuates the showing film.

With the above and other objects in view this invention consists of certain novel constructions, combinations and arrangements of parts as will be hereinafter fully described and claimed.

In the drawings:—

Figure 1 is a side elevation of the moving picture projecting machine showing the phonographic attachment applied thereto.

Fig. 2 is a side elevation of the moving picture device used as a camera and a recording machine.

Fig. 3 is a top plan view of the moving picture and talking machine or phonograph used as a camera and recording machine, the casing being shown in sections.

Fig. 4 is a section taken on line 4—4 of Fig. 3.

Fig. 5 is a section taken on line 5—5 of Fig. 3.

Fig. 6 is a section taken on line 6—6 of Fig. 3.

Fig. 7 is a side elevation of the main driving shaft, certain parts carried thereby being shown in section.

Fig. 8 is a section taken on line 8—8 of Fig. 6.

Fig. 9 is a section taken on line 9—9 of Fig. 8.

Fig. 10 is a side elevation partly shown in diagram of the sound transmitting device which may be employed in connection with the present device or moving picture machine, the sound being transmitted through the medium of an electric circuit.

It should be understood that the present device is susceptible of being used both as a moving picture taking and also a projecting machine together with a phonograph attachment for recording and reproducing the sounds. The construction of the machine does not necessarily require any changes in construction for permitting the device to be used in either a moving picture taking and recording device or to be used as a moving picture projecting and transmitting mechanism. The only rearrangement necessary is the application of the different attachments for transmitting the sound and projecting the pictures in place of the recording means and camera attachment now commonly employed upon articles of like nature.

By referring to the drawings it will be seen that 1 designates the casing which supports the mechanism comprising the present invention and this casing may be made of any shape which may be found most convenient. When the device is used as a moving picture projecting apparatus, a suitable light box 2 may be employed in the rear of the box 1 if so desired or this lighting mechanism may be supported in any convenient or desired position relative to the casing or box 1. The casing or box 1 is preferably placed in a suitable position to permit the light rays to be projected upon the screen 3 positioned in front of the casing 1 and a suitable tube 4 may be employed and connected to the casing 1 and coöperating with suitable phonographic means for conveying sound through the tube 4 to the sound discharge funnel 5 located in the rear of the screen 3. This tube construction 4 is of the same type as may be employed in speaking tubes and the like and is capable of conveying the slightest sound to the desired distance which is usually employed between the projecting apparatus and the screen upon which the picture is being shown.

It, of course, should be understood that if it is so desired the tube 4 may be replaced by means of a suitable electric circuit 6 which is connected to a reproducer 7 and is also connected to a suitable receiver 8 carried by the announcing funnel 9. This reproducer or receiving mechanism 7 may be of any suitable or desired construction for receiving and transmitting the sound recorded upon the record 10 mounted upon the record supporting mechanism 11 of any suitable or desired construction. It is further desired to point out that any suitable or desired mechanism may be employed for conveying the sound waves to a point adjacent the moving picture screen in order that the proper effect may be produced. It is therefore not desired to limit the particular construction of the means for conveying sound to the desired point, in view of the fact that either of the two ways illustrated and possibly other means may be employed for accomplishing the desired result.

It, of course, is obvious that the present mechanism may be also employed for the purpose of taking a picture and recording suitable sounds accompanying the action portrayed by the picture. When the machine is employed as a moving picture taking and sound recording mechanism, the casing 1 supports a suitable camera mechanism 12 and a sound recording funnel or horn 13, this sound recording funnel or horn 13 being mounted in a suitable manner upon the casing 1 for the purpose of recording a sound or series of sounds upon the record cylinder 14. This funnel 13 may be supported upon a suitable feed screw 15, the feed screw being mounted upon suitable brackets 16 carried by the base 17. The inner end of this feed screw 15 is provided with a worm gear 18 which worm gear meshes with a worm screw 19, the worm screw 19 being carried by a bracket 20 supported upon the base 17 and also carrying a suitable driving gear 21, the driving gear 21 meshing with suitable gear teeth 22 formed upon a suitable cylinder supporting mandrel 23. The funnel or horn 13 carries suitable feeding means 24 for the purpose of engaging the feed screw 15 and for moving the funnel 13 longitudinally upon the screw 15.

The mandrel 23 is provided with a centrally located sleeve portion 25, through which sleeve portion 25 extends the supporting shaft 26. This supporting shaft 26 is supported upon a suitable standard 27 at the inner end thereof as clearly illustrated in Fig. 3 of the drawings. A suitable binding milled nut 28 is threaded upon the outer end of this shaft 26 for the purpose of efficiently connecting the shaft in engagement with the standard 27. The standard 27 is provided with a transversely extending elongated slot 29 upon the upper end thereof, through which slot 29 extends the inner end of the shaft 26 as clearly illustrated in Fig. 6 of the drawings. This shaft 26 is provided with a toothed portion 30 formed near the inner end thereof, which toothed portion 30 meshes with a rack portion 31 formed in the upper end of the slot 29 as clearly illustrated in detail in Figs. 8 and 9 of the drawings. A suitable operating lever 32 is pivotally mounted upon the upper end of the standard 27 as clearly shown in Fig. 6 of the drawings and this operating lever 32 is provided with a toothed lower end 33, the toothed lower end 33 meshing with the toothed portion 30 formed upon the shaft 26. It will therefore be seen that as the lever 32 is swung laterally, the shaft 26 may be shifted transversely across the standard 27 and in this way throw the teeth 22 upon the periphery of the mandrel 23 out of engagement with the gear 21 and at the same time throw the teeth 34 formed upon the end of the mandrel extending at right angles to the teeth 22 out of engagement with the gear 35.

The driving gear 35 which meshes with the teeth 34 formed upon the inner face of the mandrel 23 is carried by the main driving shaft 36, the main driving shaft 36 extending through and being supported by the vertically extending partition 37 mounted within the casing 1. This shaft 36 is provided with a squared shank 38 formed upon the outer end thereof for the purpose of receiving a crank or other suitable mechanism to permit the shaft 36 to be easily turned.

The gear portion 35 is provided with a clutch jaw 39 formed upon the inner face thereof, and this clutch jaw 39 is adapted to mesh with the clutch jaw 40 carried by the shifting sprocket 41. This sprocket 41 is carried by a suitable supporting sleeve 42 which is loosely mounted on sleeves 36 and the sprocket 41 receives a suitable driving chain 43, the chain 43 also passing over a sprocket wheel 44 carried by the transversely extending shaft 45. The sprocket wheel 41 is also provided with a flanged portion 46, the flanged portion 46 being engaged by means of a suitable shifting lever 47, this lever 47 being pivotally mounted upon a bracket 48 carried by one of the partition members 37 as clearly illustrated in Fig. 7 of the drawings. By considering Figs. 3 and 7 it will be seen that the lever 47 may be actuated to disengage the clutch members 39 and 40 thereby permitting the phonographic attachment to operate while the motion picture mechanism remains stationary.

The feeding pulley 49 is carried by the sleeve 42 and is provided with a plurality of knobs 50 for the purpose of conveniently engaging the film 51 and efficiently feeding the same. This feeding pulley 49 is anchored upon the sleeve 42 by means of suitable screws 52, these screws 52 passing into a longitudinally extending slot 53 formed in the sleeve 42 to permit the sleeve 42 to freely slide without interfering with the pulley 49 as will be obvious by considering Fig. 7 of the drawings. The shaft 36 is of course supported upon suitable bearing members 54 and 55 for the purpose of efficiently holding the shaft upon the partition 37 and the inner end of the sleeve 42 is also supported upon a suitable bearing 56 as shown clearly in Fig. 7 of the drawings.

An unwinding reel 57 is supported upon the top of the two inner partitions 37 as shown clearly in Figs. 4 and 3 of the drawings and this unwinding reel 57 carries a suitable film 51 above mentioned, which film, 51 passes over an idle pulley 58 and then passes through the suitable guiding member 59. The guiding member 59 is provided with a hinged lower section 60, this hinged lower section being provided with a projecting arm 61 carrying a laterally extending pin 62 working within a slot 63. This pin 62 carries a suitable binding nut 64 for the purpose of locking the hinged lower section 60 in a set position. The film 51 then passes over the winding reel 65. This winding reel 65 is provided with a supporting shaft 66 working within the arc-shaped slot 67 formed in the partition 37 for the purpose of permitting the reel 65 to have a free upward and downward movement and also for the purpose of forcing the film 51 to bear in a traction like manner upon the traction wheel 68. This traction wheel 68 is carried by the shaft 45, which shaft 45 supports the sprocket wheel 44 and is driven through the medium of the sprocket chain 43 above described. Upon considering Fig. 4 it will be seen that the film 51 will at all times be kept in a taut condition, due to the fact that the film is directly engaged by means of a traction drive wheel 68.

A suitable friction brake 69 is carried by the upper ends of the two inner partitions 37 as shown clearly in Fig. 4 and this friction brake comprises a friction plate 70 adapted to engage the periphery of the unwinding reel 57 as shown clearly in Fig. 4. The friction brake 69 is pivotally mounted upon a supporting shaft 71 and this brake also carries a projecting threaded shank 72 upon which is threaded an adjustable weight 73 for adjusting the frictional resistance of the brake 69 upon the periphery of the unwinding reel 57. In this way the film 51 will be prevented from unwinding from the unwinding reel 57 at a greater rate of speed than the same is wound upon the winding reel 65.

In view of the fact that it may also be advisable and convenient to rewind a reel while one reel is being shown or a picture taken thereon, I have provided a means whereby the one film may be rewound as the other is being unwound. I therefore provide a pair of parallel partitions as clearly shown in the drawings, two of the partitions being provided with converging substantially arc-shaped grooves 74 within which grooves 74 are mounted the shafts 75 of the respective reels 76 and 77. These reels 76 and 77 are so mounted within the slots 74 as to cause the film wound thereon to bear directly against the traction wheel 78 and as the film is wound upon one of the reels, such for instance as the reel 76 and unwound from the reel 77, the reel 76 will move upwardly through the slots 74 and the reel 77 will move downwardly, the film being at all times held in engagement with the traction wheel 78 through the medium of the force of gravity.

From the foregoing description it will be seen that a very simple and efficient means has been produced whereby a moving picture may be taken and suitable sounds simultaneously recorded therewith and it will be also obvious that practically the same machine may be employed for reproducing the sound and projecting the picture upon a moving picture screen. Simultaneously with the operation of the machine, a film may be rewound in a suitable compartment through the same driving mechanism which actuates the machine. It should be further understood that the phonograph attachment may be readily detached or thrown out of operation with respect to the moving picture apparatus.

It, of course, should be understood that the traction rollers or wheels 78 and 68 are provided with suitable soft rubber or other yieldable cushion treads 79 for the purpose of preventing the film 51 from being injured as the same is wound upon the respective reels. It should be understood that the roller which engages the rewinding film, should be of sufficient size as to cause the film to be rewound in less time than it requires to wind the film which is being shown or upon which a picture is being taken. It should be further understood of course that the gears which are employed in connection with the present invention may be of suitable proportion to cause the phonograph and moving picture apparatus to simultaneously operate and to be actuated in unison. For instance the feed roller 49 is preferably made 3 inches in diameter whereas the gear 35 is preferably made 2 inches in diameter, the gear 35 meshing with the gear teeth formed upon the inner face of the mandrel 23, these gear teeth being indicated by the numeral 34 in Fig. 3.

By considering Fig. 3 it will be seen that a positive driving means has been produced which directly acts upon the mandrel 23 for driving the same and also directly operates the moving picture film supporting mechanism without the necessity of employing complicated arrangement of gearing for accomplishing the desired result. At the same time the phonograph mechanism will be operated in unison with the moving picture apparatus and without any danger of injuring the film or cause the same to actuate out of harmony with the phonograph attachment. Inasmuch as the film 51 moves continuously when the clutch members 39 and 40 are engaged, an optical rectifying means or shutter, not shown, must be used to obtain a proper reproduction of the images on the film.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the appended claims.

Having thus fully described my invention, what I claim as new and desire to protect by Letters Patent, is:—

1. In combination with a moving picture machine, a phonographic attachment, a driving means carried by said moving picture machine and coöperating with said phonographic attachment, said phonographic attachment comprising a record supporting mandrel, a supporting bracket therefor, and means carried by said supporting bracket and engaging said mandrel for bodily moving the same laterally and shifting the same out of engagement with the said driving means.

2. In combination with a moving picture machine, a driving means therefor, of a phonograph attachment supported adjacent said driving means, said phonographic attachment comprising a mandrel, a standard, a shaft carried by said mandrel and adjacent said standard whereby said mandrel will be efficiently supported, driving means for said mandrel, and means carried by said standard and engaging said shaft for shifting the same laterally upon said standard and bodily moving said mandrel out of engagement with said mandrel driving means.

3. In combination with a moving picture machine, of a phonographic attachment comprising a mandrel adapted to support a record, driving means for synchronously operating said moving picture machine and said phonographic attachment, a standard, a shaft carried by said mandrel and passing through said standard, said standard provided with a transversely extending aperture formed therein, said shaft extending through said aperture, driving means adapted to engage said mandrel, and an operating lever engaging said shaft for bodily moving said mandrel to an inoperative position out of engagement with said driving means.

4. In combination with a moving picture machine, a phonographic attachment, driving means for synchronously operating said moving picture machine and said phonographic attachment, of a mandrel, a standard supporting said mandrel, said mandrel provided with a supporting shaft, said standard provided with a transversely extending elongated aperture through which said shaft projects, means for holding said shaft against longitudinal movement through said standard, ratchet teeth formed upon the periphery of said elongated slot, gear teeth formed upon said shaft and meshing with said ratchet teeth, and a lever provided with teeth engaging the teeth formed upon said shaft for shifting said shaft bodily in a lateral position upon said standard and moving said mandrel out of engagement with said driving means.

5. In combination with a moving picture machine, of a phonograph attachment supported adjacent thereto, a driving shaft provided with a driving gear, a record supporting medium carried adjacent said moving picture machine and provided with means meshing with said driving gear, a supporting shaft for said record supporting medium, a supporting standard provided with a transversely extending slot formed therein, said shaft extending through said transversely extending slot, a pivoted lever carried by said standard and provided with teeth formed upon the under face thereof, said shaft provided with teeth formed thereon, teeth formed upon one edge of said transversely extending slot and meshing with the teeth formed upon said shaft whereby said shaft will be caused to move in a lateral position across said standard and longitudinally of said slot as said lever is swung for bodily moving said record supporting medium out of engagement with said driving gear.

6. In combination with a moving picture machine, of a phonograph attachment supported adjacent thereto, a driving shaft provided with a driving gear, a record supporting medium carried adjacent said moving picture machine and provided with means meshing with said driving gear, a supporting shaft for said record supporting medium, a supporting standard provided with a transversely extending slot formed therein, said shaft extending through said transversely extending slot, a pivoted lever carried by said standard and provided with teeth formed upon the under face thereof, said shaft provided with teeth formed thereon, teeth formed upon one edge of said transversely extending slot and meshing with the teeth formed upon said shaft whereby said shaft will be caused to move in a lateral position across said standard and longitudinally of said slot as said lever is swung for bodily moving said record supporting medium out of engagement with said driving gear, a horn feeding means mounted adjacent said mandrel comprising a worm gear and worm screw feeding mechanism, a driving gear carried by said worm screw, and means carried by said record supporting medium meshing with said last mentioned gear for driving the same and actuating said feeding screw.

7. In combination with a moving picture machine, of a phonographic attachment, means for supporting a record upon said phonograph attachment, a driving gear, a clutch jaw carried by said driving gear, a driving shaft carried by said moving picture machine and carrying said driving gear, a sleeve loosely mounted upon said driving shaft, a driving sprocket carried by said sleeve and provided with clutch means adapted to engage said clutch jaw whereby said sleeve will be rotated, and a feeding roller carried by said sleeve and keyed thereto and permitting said sleeve to have free longitudinal sliding movement through said feeding roller.

8. In combination with a moving picture machine, of a phonographic attachment, means for operating said moving picture machine and said phonographic attachment synchronously, said means including a shaft, a driving gear keyed to said shaft, for operating said phonographic attachment, a film feeding roller loosely mounted upon said shaft, and means for causing said roller to rotate in unison with said shaft whereby the phonographic attachment and moving picture mechanism may operate independently of each other or synchronously with each other.

In testimony whereof I affix my signature in presence of two witnesses.

JOHN F. OSBORN.

Witnesses:
   GEORGE E. OSBORN,
   JAMES H. OSBORN.